(12) United States Patent
Na

(10) Patent No.: US 10,160,390 B2
(45) Date of Patent: Dec. 25, 2018

(54) NET POCKET APPARATUS FOR VEHICLE

(71) Applicant: Hyundai Motor Company, Seoul (KR)

(72) Inventor: Won Young Na, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 20 days.

(21) Appl. No.: 15/449,143

(22) Filed: Mar. 3, 2017

(65) Prior Publication Data

US 2018/0118119 A1    May 3, 2018

(30) Foreign Application Priority Data

Nov. 2, 2016    (KR) .................. 10-2016-0145387

(51) Int. Cl.
*B60R 7/00*    (2006.01)
*B60R 7/02*    (2006.01)

(52) U.S. Cl.
CPC ............. *B60R 7/005* (2013.01); *B60R 7/02* (2013.01)

(58) Field of Classification Search
CPC ................................ B60R 7/005; B60R 7/02
USPC ...................................................... 296/37.8
See application file for complete search history.

(56) References Cited

U.S. PATENT DOCUMENTS 7,121,601 B2 * 10/2006 Mulvihill .................. B60R 7/02
                                                         296/24.33
7,708,329 B2 *  5/2010 Duller ...................... B60R 9/00
                                                         296/37.13

FOREIGN PATENT DOCUMENTS

KR          20030008913 A    1/2003

* cited by examiner

*Primary Examiner* — Joseph D. Pape
*Assistant Examiner* — Dana D Ivey
(74) *Attorney, Agent, or Firm* — Slater Matsil, LLP

(57) ABSTRACT

A net pocket apparatus for a vehicle includes a base frame having guide rails formed respectively on opposite inner surfaces. A movable frame has guide protrusions moving along the guide rails. The movable frame is nested in and fixed to the base frame when the guide protrusions are positioned at one ends of the guide rails while the movable frame is fixed in a form of protruding from the base frame when the guide protrusions are positioned at the other ends of the guide rails. A net wire with opposite ends is rotatably coupled to the movable frame such that it is fixed to the movable frame in a form of being nested in the movable frame or a form of protruding from the movable frame. A net is coupled to the net wire.

20 Claims, 15 Drawing Sheets

[FIG. 1]
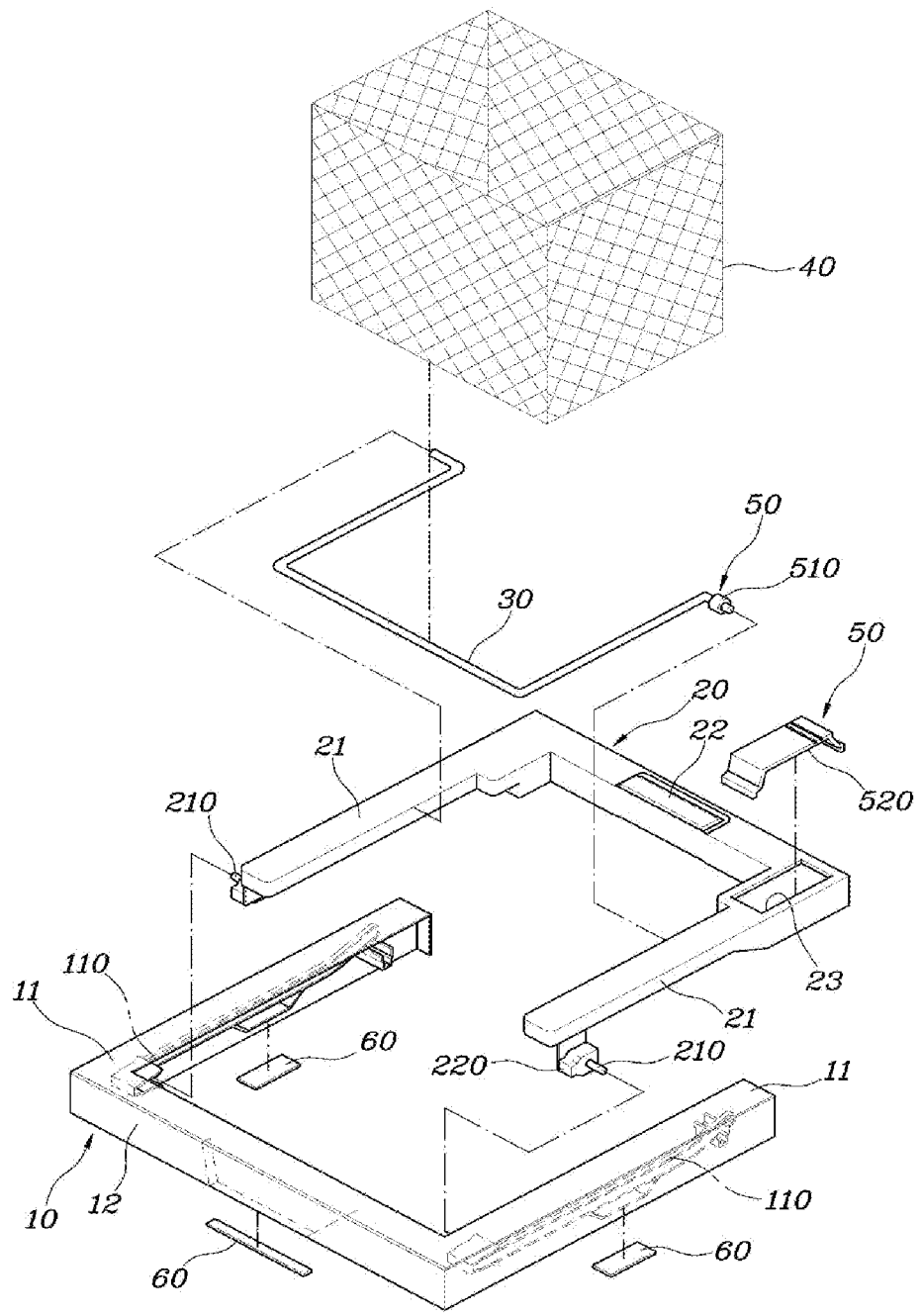

[FIG. 2]
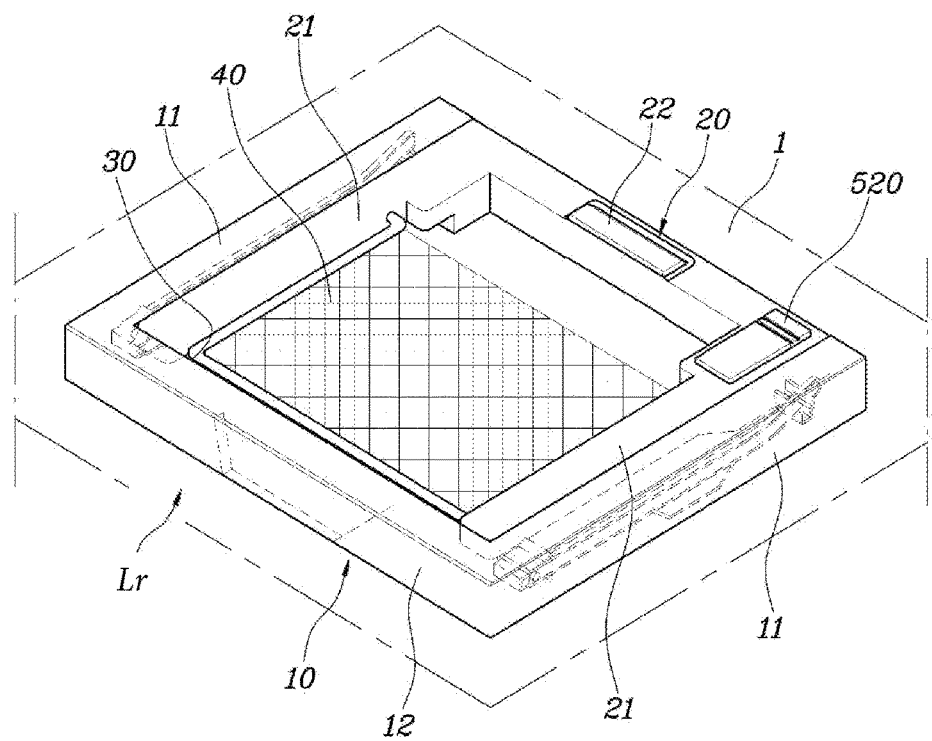

[FIG. 3]
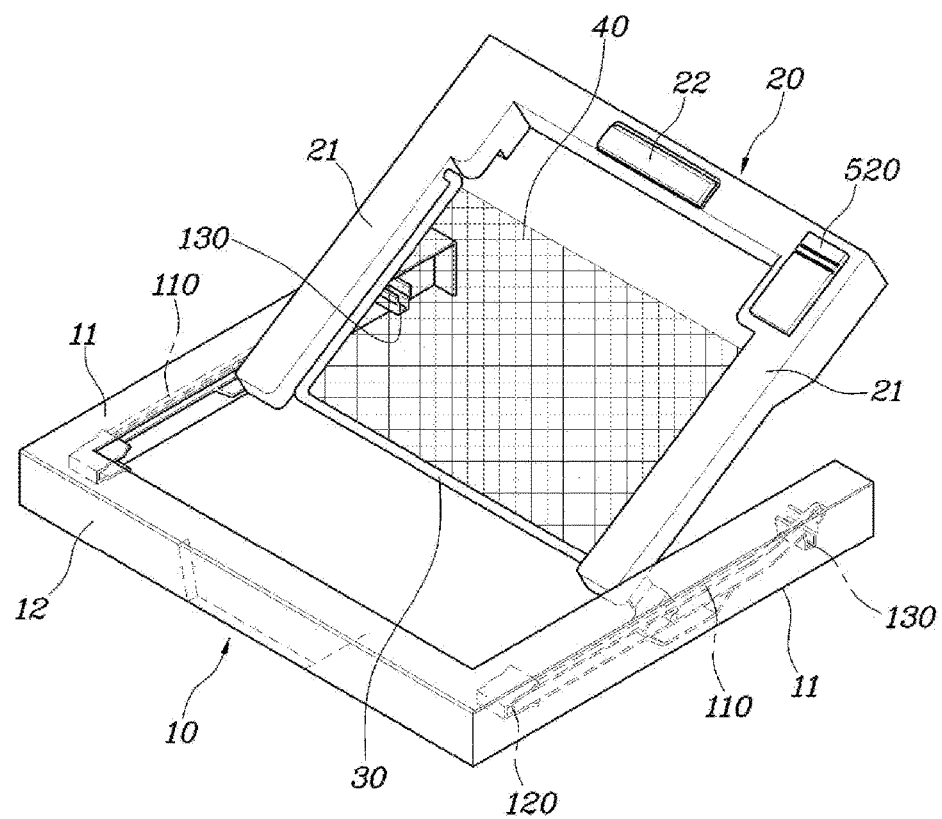

[FIG. 4]
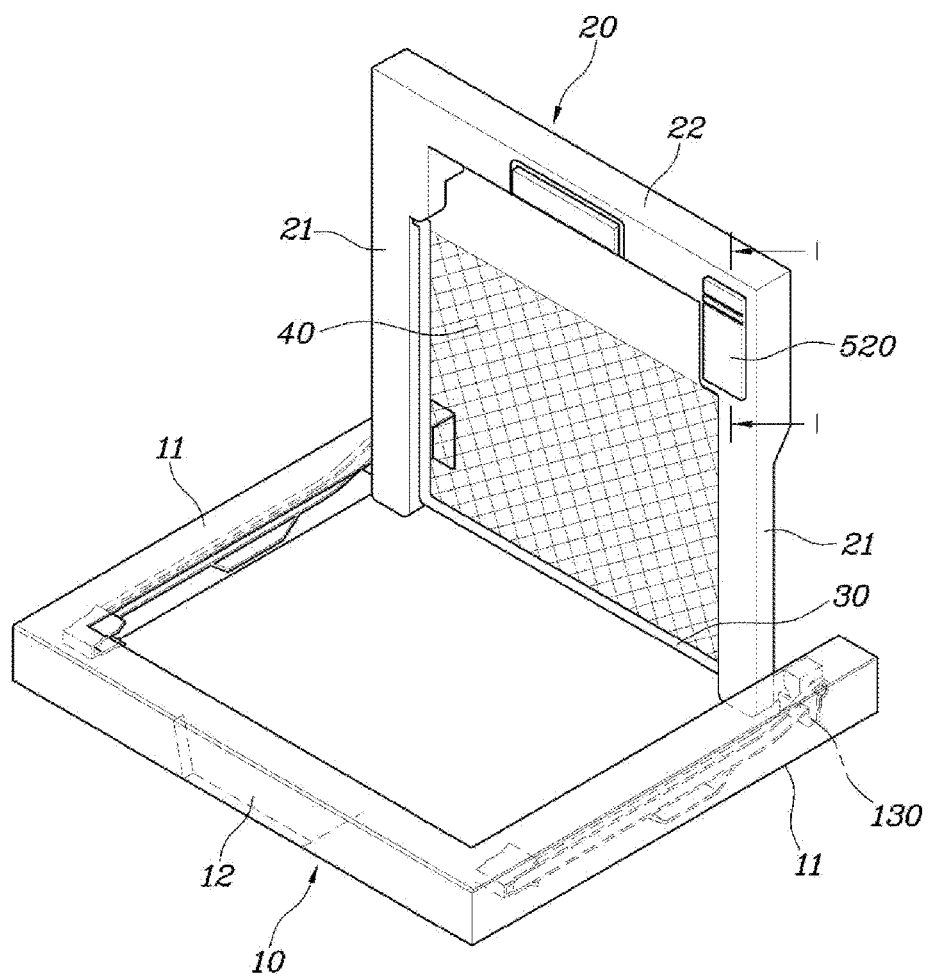

[FIG. 5]
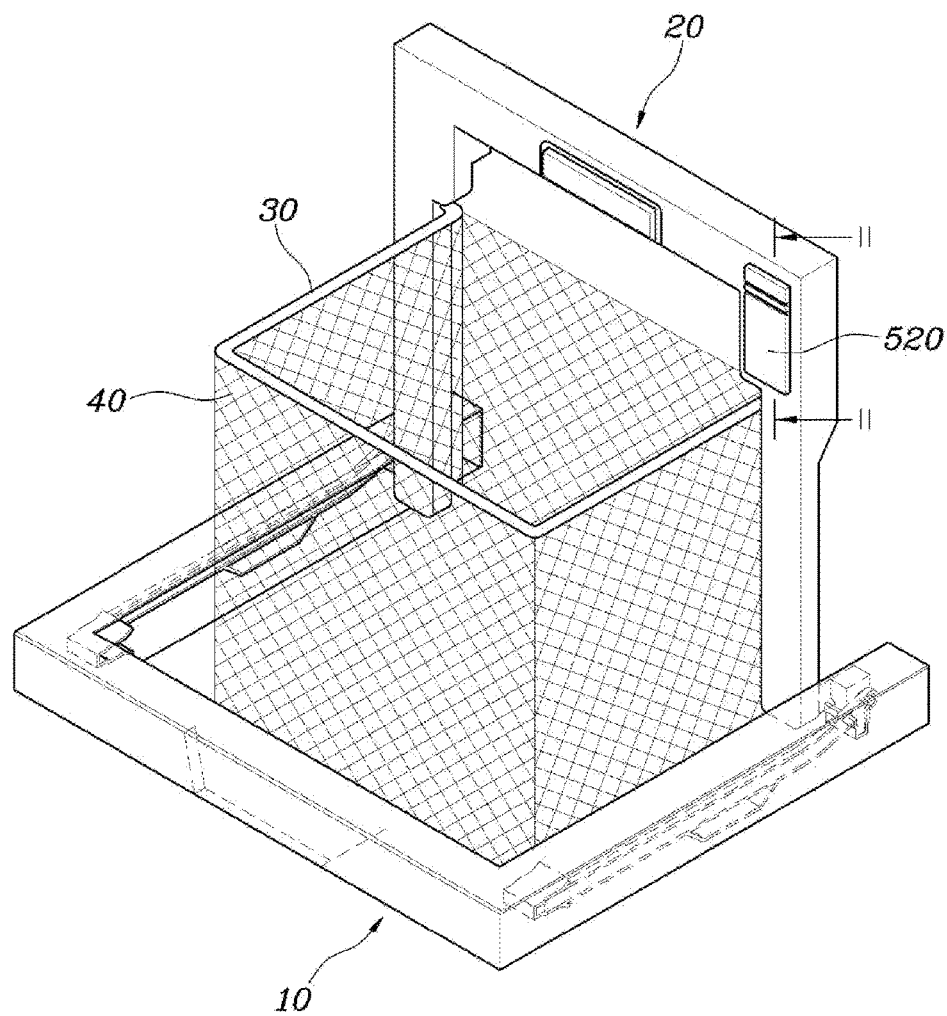

[FIG. 6]
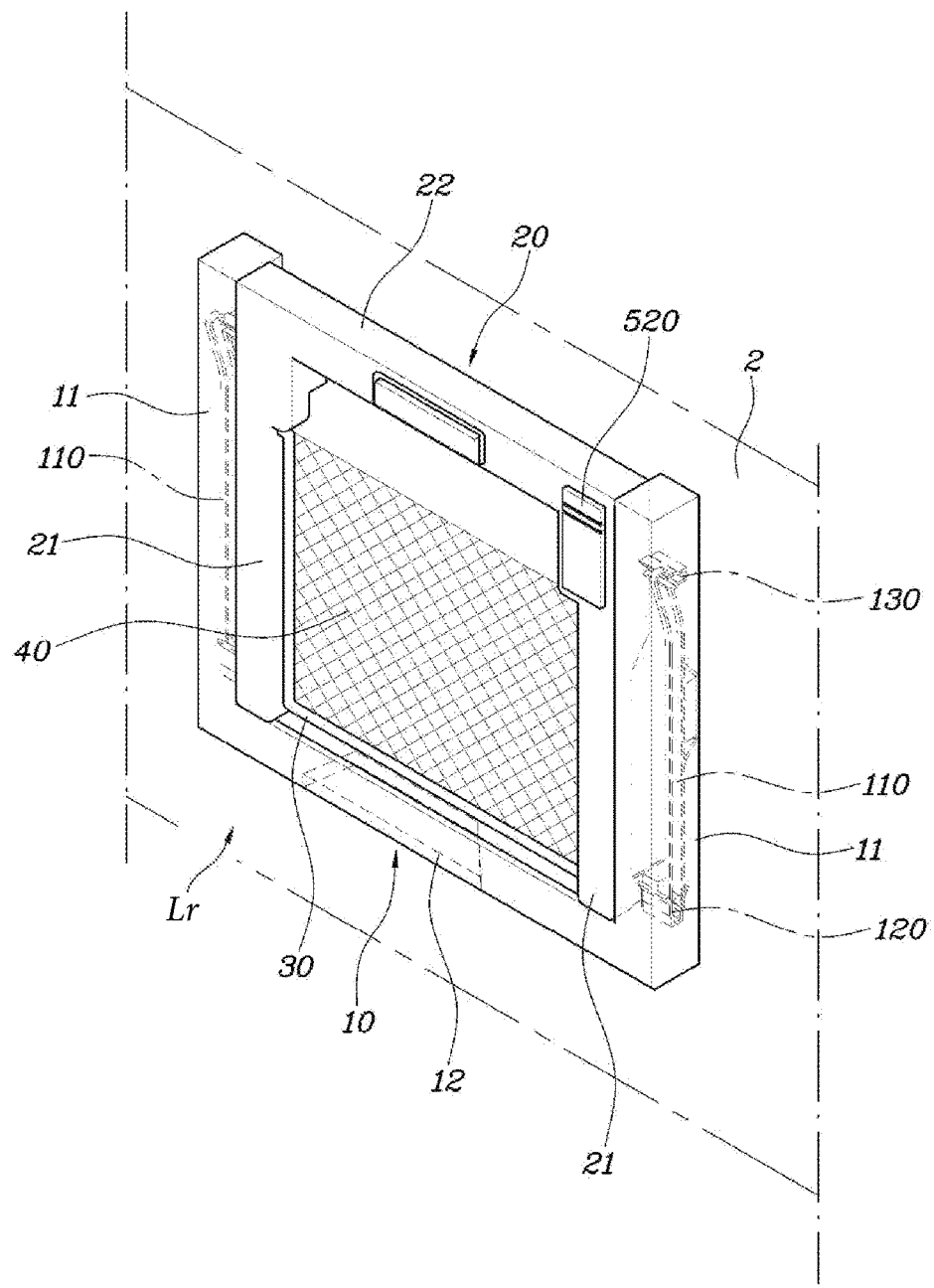

[FIG. 7]
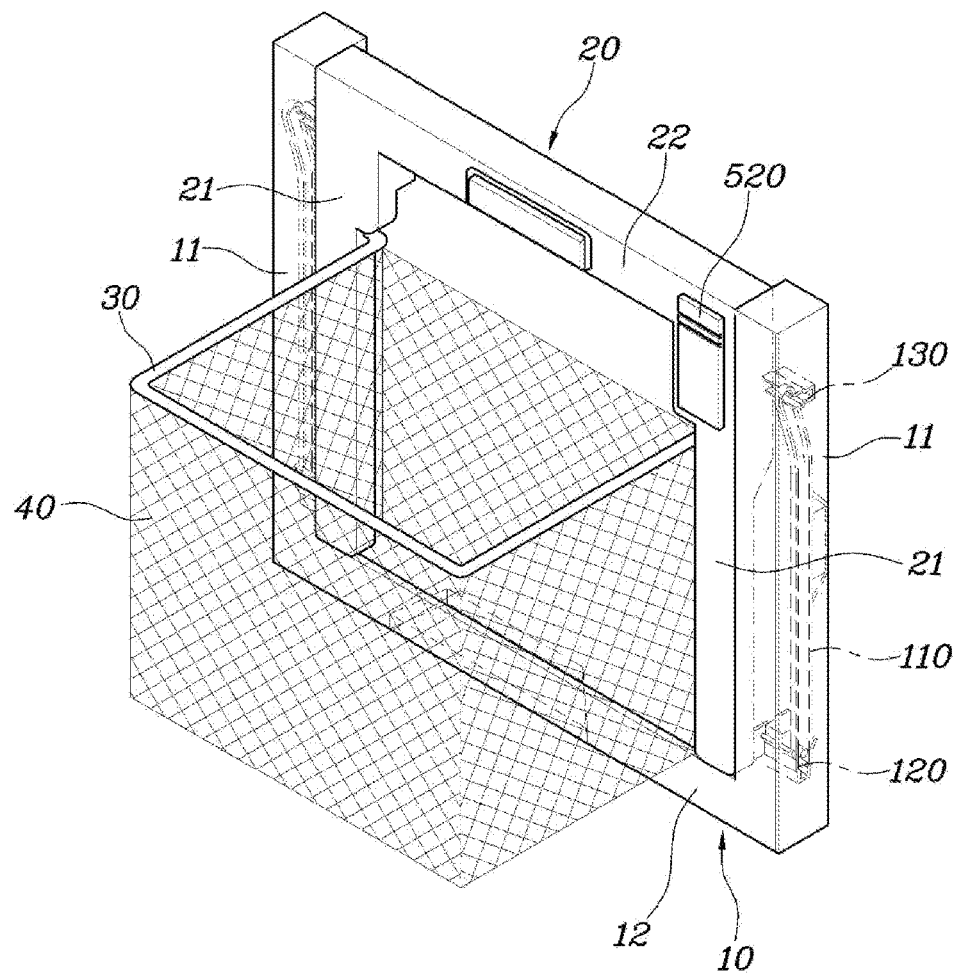

[FIG. 8]
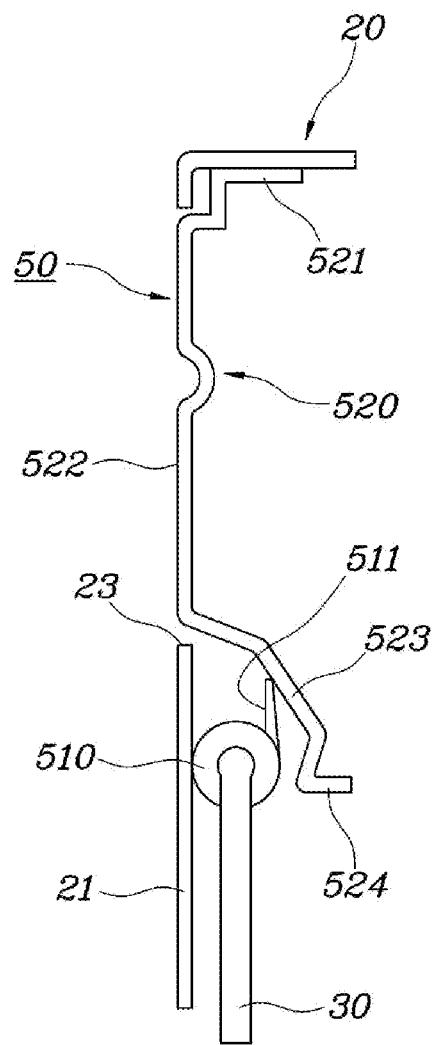

[FIG. 9]
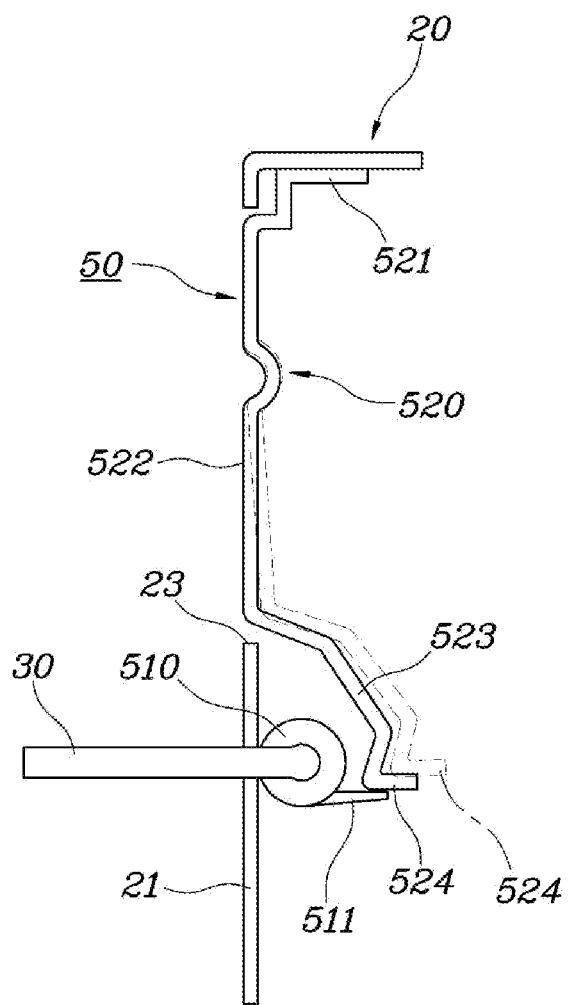

[FIG. 10]
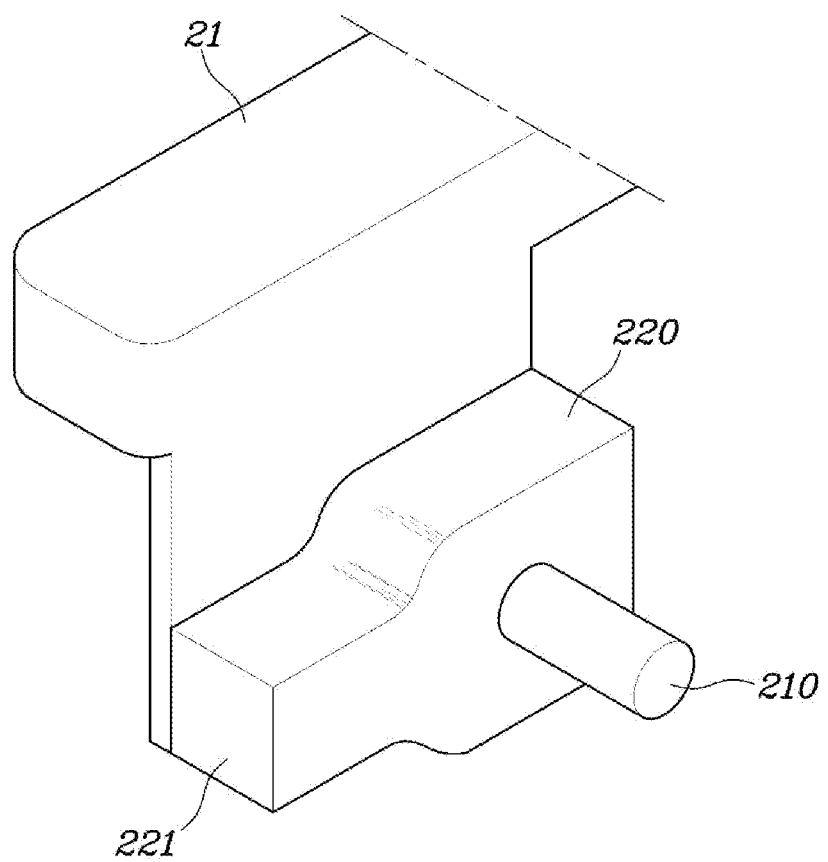

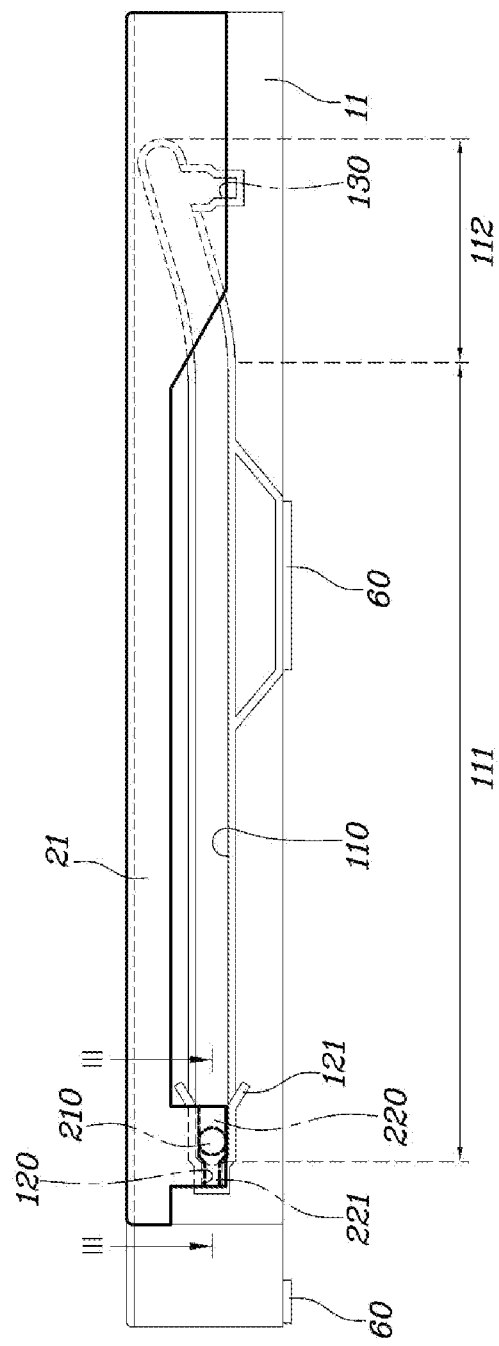
[FIG. 11]

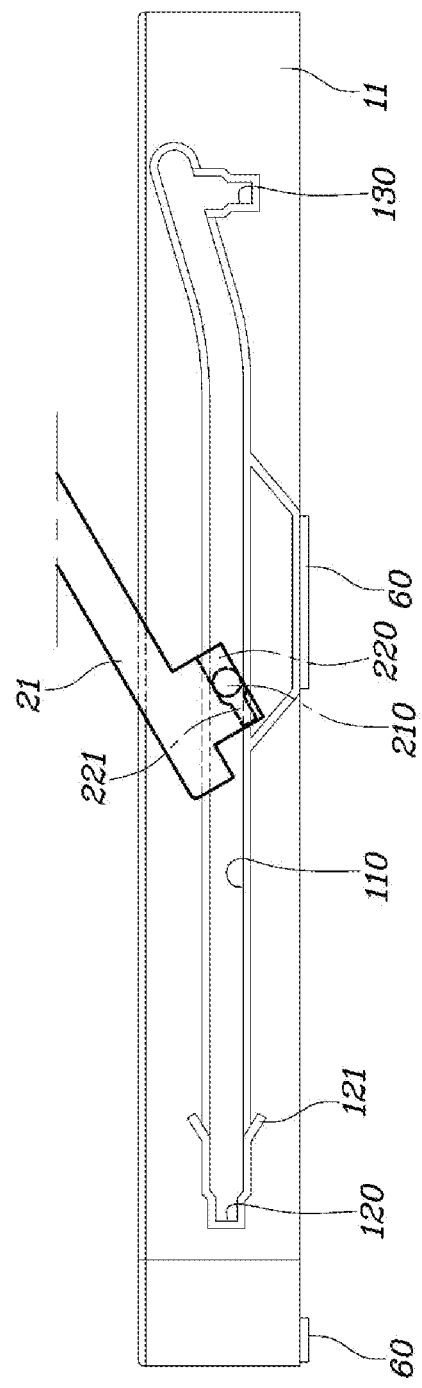
[FIG. 12]

[FIG. 13]
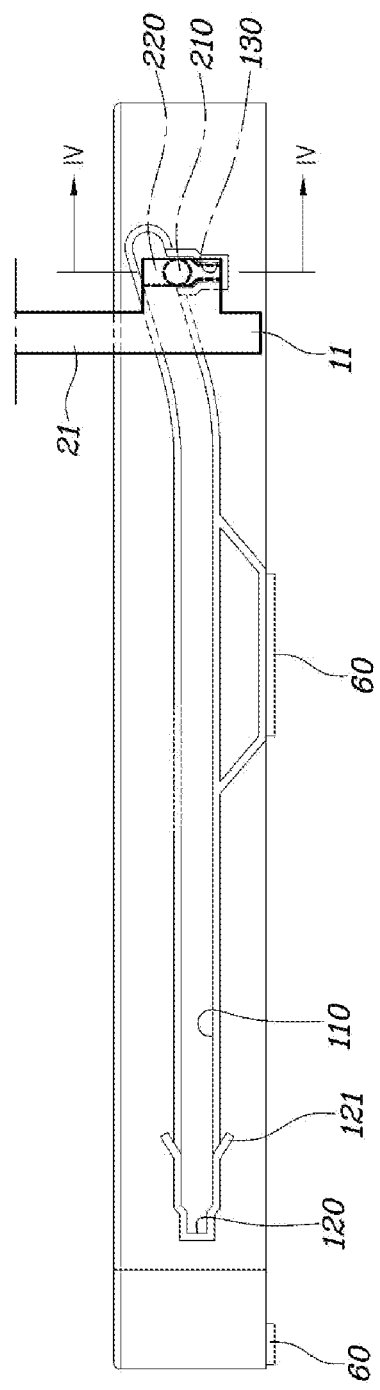

[FIG. 14]
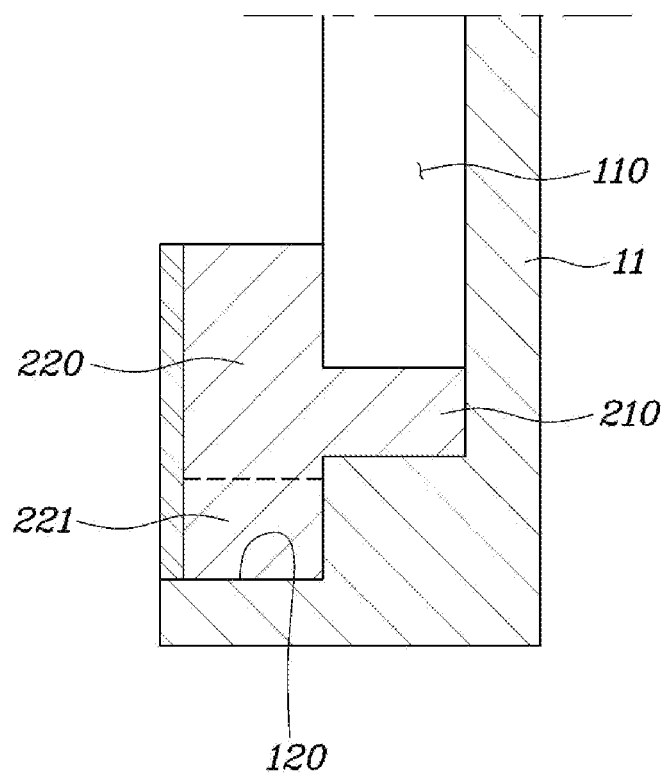

[FIG. 15]
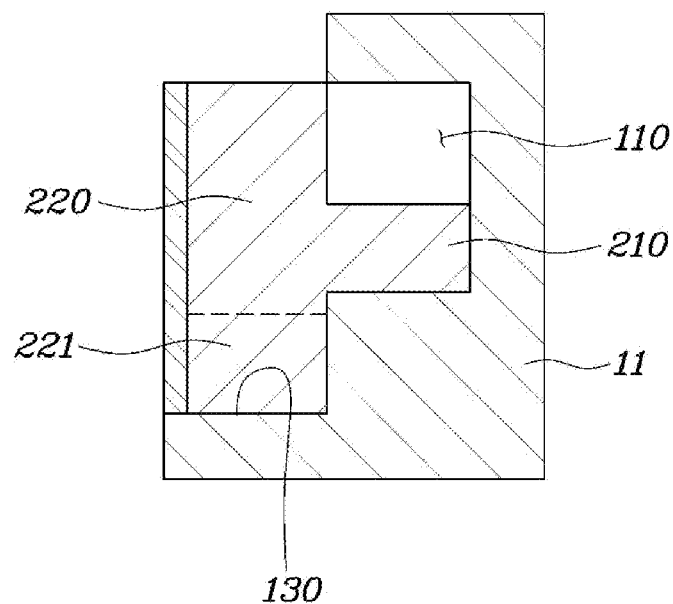

NET POCKET APPARATUS FOR VEHICLE

CROSS-REFERENCE TO RELATED APPLICATIONS

The present application claims priority of Korean Patent Application No. 10-2016-0145387 filed on Nov. 2, 2016, the entire contents of which is incorporated herein for all purposes by this reference.

TECHNICAL FIELD

The present invention relates to a net pocket apparatus for a vehicle.

BACKGROUND

As an approach to keep small items in a space of a luggage room of a vehicle, there is a way to use a space for storing a spare tire, which is a space below a luggage board, or a tray of which position is fixed on a side wall (i.e., side trim) of the luggage room, or the like.

However, there are drawbacks in that in order to utilize the storage space for the spare tire, a user has to work to raise a bulky luggage board, which is inconvenient, and in particular, necessary items cannot be stored when the spare tire is stored therein.

Further, if a bulky cargo is loaded in the luggage room or the luggage room is full of various items, it may be difficult to use any tray located on the side wall of the luggage room to store small items. In other words, any tray which is provided fixedly at a certain position in the luggage room has a disadvantage in that it may not receive and store items in some cases and in particular, a separate space for installation of the tray must be secured in the luggage room.

As the foregoing described as the background art is just to promote better understanding of the background of the present invention, it must not be taken as an admission that it corresponds to the prior art well known to those who have ordinary skill in the art.

SUMMARY

The present invention relates to a net pocket apparatus for a vehicle, and in particular embodiments, to a net pocket apparatus for a vehicle that can be used without any restriction on the mounting position thereof by means of a detachable and foldable structure when used as a pocket for storing goods and can be folded and kept when not in use. As such, embodiments of the present invention provide a net pocket apparatus for a vehicle having a detachable and foldable structure that is convenient to use, can be easily folded and kept and is not limited on the mounting position thereof.

In one embodiment, a net pocket apparatus for a vehicle comprises a base frame having guide rails formed respectively on opposite inner surfaces. A movable frame has guide protrusions moving along the guide rails. The movable frame is nested in and fixed to the base frame when the guide protrusions are positioned at one ends of the guide rails while the movable frame is fixed in a form of protruding from the base frame when the guide protrusions are positioned at the other ends of the guide rails. A net wire with opposite ends is rotatably coupled to the movable frame such that it is fixed to the movable frame in a form of being nested in the movable frame or a form of protruding from the movable frame. A net is coupled to the net wire, the net being unfolded by its own weight to form a storage space when the net wire is fixed in the form of protruding from the movable frame.

In various embodiments, the net pocket apparatus further comprises a wire locking mechanism for restraining or releasing rotational movement of the net wire, the wire locking mechanism being provided at the movable frame and the net wire.

In various embodiments, the net pocket apparatus further comprises a plurality of fabric hook and loop fasteners coupled to the base frame for facilitating attachment and detachment of the base frame.

In various embodiments, the base frame comprises a pair of base frame side members on which the guide rails are formed respectively along a longitudinal direction, and a base frame connection member connecting between one ends of the base frame side members.

In various embodiments, the movable frame comprises a pair of movable frame side members with guide protrusions formed at one ends thereof so as to project laterally, the movable frame side members being nested in the inside of the base frame side members and extending along a longitudinal direction of the base frame side members respectively; and a pair of movable frame connection member connecting between the other ends of the pair of movable frame side members in a manner of facing the pair of base frame connection member.

In various embodiments, stopper blocks protruding laterally are formed at one ends of the movable frame side members respectively and guide protrusions are formed to protrude from side surfaces of the stopper blocks. These elements are installed in such a manner that only the guide protrusions are inserted into the guide rails.

In various embodiments, each of the guide rails comprises a straight section extending from one end of the base frame side member along the longitudinal direction of the base frame side member and an inclined section extending from the straight section. A first fixing groove and a second fixing groove to which one end of the stopper block is fitted and fixed are formed at a site where an end portion of the straight section is located and a site where an end portion of the curved section is located, respectively. The movable frame is nested in the base frame to form a frame of a specific shape when one end of the stopper block is fitted into and fixed to the first fixing groove. The movable frame takes a form protruded from the base frame when one end of the stopper block is fitted into and fixed to the second fixing groove.

In various embodiments, the movable frame is positioned in the base frame and forms a quadrilateral shaped frame together the base frame when one end of the stopper block is fitted into and fixed to the first fixing groove.

In various embodiments, the movable frame takes a form protruded orthogonally from the base frame when one end of the stopper block is fitted into and fixed to the second fixing groove.

In various embodiments, the wire locking mechanism comprises a wire block coupled to one end of the net wire to rotate together with the net wire and provided with a protrusion protruding outward. The wire locking mechanism also comprises an elastic piece having one end fixed to the movable frame and the other end installed to be a free end and to contact with the protrusion of the wire block. The elastic piece serves to press the protrusion of the wire block by means of its elastic force.

In various embodiments, the wire locking mechanism comprises elastic piece comprises a fixing portion formed at one end to fixedly coupled to the inner surface of the movable frame, a manipulating portion extending from the fixing portion and exposed to the outside through a through hole of the movable frame, and a pressing portion extending from the manipulating portion so as to protrude to the inside of the movable frame and contacting with the protrusion of the wire block. A latching jaw portion is formed at the end of the pressing portion and the net wire is fixed in a state of protruding from the movable frame when the protrusion of the wire block is latched to the latching jaw portion.

In various embodiments, the net wire is brought to be fixed in a form of being protruded in an orthogonal direction from the movable frame when the protrusion of the wire block is latched to the latching jaw portion of the elastic piece, and the net wire is brought to rotate by its own weight to be nested in the movable frame when the latching jaw portion is separated from the protrusion as the manipulating portion of the elastic piece is pressed through the through hole under the state that the protrusion is engaged with the latching jaw portion.

In various embodiments, the base frame is mounted by means of fabric hook and loop fasteners on the bottom surface of a luggage room in a state of being seated thereon, or on a side wall of the luggage room in a state of being erected.

An embodiment according to the present invention is of a compact structure that can be detached and attached by using fabric hook and loop fasteners and can be kept in a foldable manner. This makes it possible to simply fold and keep and use conveniently without any restriction on the mounting position thereof so that an effect of enhancing merchantability exists.

BRIEF DESCRIPTION OF THE DRAWINGS

FIG. 1 is an exploded perspective view of a net pocket apparatus for a vehicle according to the present invention.

FIGS. 2 to 5 are views showing the state of using a net pocket apparatus mounted on a bottom surface of a luggage room in accordance with the present invention.

FIGS. 6 to 7 are views showing the state of using a net pocket apparatus mounted on a side wall of a luggage room in accordance with the present invention.

FIGS. 8 to 9 are views illustrating a wire locking mechanism according to the present invention, wherein FIG. 8 is a sectional view taken along line I-I in FIG. 4 and FIG. 9 is a sectional view taken along line II-II in FIG. 5.

FIG. 10 is a view illustrating a stopper block and a guide protrusion according to the present invention.

FIG. 11 is a view showing the state of FIG. 2 or FIG. 6 in which a movable frame is nested in a base frame as a stopper block is fitted into a first fixing groove.

FIG. 12 is a view showing the state of FIG. 3 which is in an intermediate process in which a movable frame is moving along a guide rail.

FIG. 13 is a view showing the state of FIG. 4 or FIG. 5 in which a movable frame is protruded from a base frame as a stopper block is fitted into a second fixing groove.

FIG. 14 is a sectional view taken along line III-III in FIG. 11.

FIG. 15 is a sectional view taken along line IV-IV in FIG. 13.

DETAILED DESCRIPTION OF ILLUSTRATIVE EMBODIMENTS

A net pocket apparatus for a vehicle according to a preferred embodiment of the present invention will now be described in detail with reference to the accompanying drawings. However, the present invention is not limited or restricted by the preferred embodiment.

The net pocket apparatus for a vehicle according to the present invention has a structure capable of being detachable for changing a mounting position thereof, that is, a configuration capable of attaching to various positions on a floor of a luggage room (i.e., luggage board) or various positions on a side wall of the luggage room (i.e., side trim) to use. For example, the structure can be utilized in the trunk of a car.

As shown in FIGS. 1 to 15, the net pocket apparatus for a vehicle for realizing the matters as mentioned above comprises a base frame 10 having guide rails no formed respectively on opposite inner surfaces; a movable frame 20 having guide protrusions 210 moving along the guide rails no, the movable frame being nested in and fixed to the base frame 10 when the guide protrusions 210 are positioned at one ends of the guide rails no while the movable frame being fixed in a form of protruding from the base frame 10 when the guide protrusions 210 are positioned at the other ends of the guide rails no; a net wire 30 with opposite ends rotatably coupled to the movable frame 20 such that it is fixed to the movable frame in a form of being nested in the movable frame 20 or a form of protruding from the movable frame 20; and a net 40 coupled to the net wire 30, the net being unfolded by its own weight to form a storage space when the net wire 30 is fixed in the form of protruding from the movable frame 20.

The net 40 has a mesh net type or a vinyl type structure and is formed in a three-dimensional shape having a storage space therein. The storage space inside the net is communicated with the outside via an opening formed at one side of the net and a portion where the opening is formed has a structure coupled with the net wire 30.

Further, the present invention further comprises a wire locking mechanism 50 provided on the movable frame 20 and the net wire 30 to restrain or release rotational movement of the net wire 30, and a plurality of fabric hook and loop fasteners 60 (which is sold under the brand name Velcro™, as an example) coupled to the base frame in order to facilitate attachment and detachment of the base frame.

The base frame 10 is mounted by means of fabric hook and loop fasteners 60 on the bottom surface 1 of a luggage room Lr (i.e., luggage board) in a state of being seated thereon as shown in FIG. 2, or on a side wall (i.e., side trim) 2 of the luggage room Lr in a state of being erected as shown in FIG. 6.

Further, the base frame 10 can be attached to various positions on the floor 1 of the luggage room or various positions on the side wall 2 of the luggage room Lr by the characteristic of the detachable Velcro 60.

The base frame 10 comprises a pair of base frame side members 11 on which the guide rails no are formed respectively along a longitudinal direction; and a base frame connection member 12 connecting between one ends of the base frame side members 11.

The movable frame 20 comprises a pair of movable frame side members 21 with guide protrusions 210 formed at one ends thereof so as to project laterally, the movable frame side members being nested in the inside of the base frame side members 11 and extending along a longitudinal direction of the base frame side members 11 respectively; and a pair of movable frame connection member 22 connecting between the other ends of the pair of movable frame side members 21 in a manner of facing the pair of base frame connection member 12.

Stopper blocks 220 protruding laterally are formed at one ends of the movable frame side members 21 respectively and guide protrusions 210 are formed to protrude from side surfaces of the stopper blocks 220 wherein these elements are installed in such a manner that only the guide protrusions 210 are inserted into the guide rails no while the stopper blocks 220 are positioned outside the guide rails no.

A quadrilateral protrusion or a circular protrusion is integrally formed at one end of the stopper block 220. The quadrilateral protrusion or the circular protrusion constitutes an inserting portion 221 which is fitted into and fixed to either a first fixing groove 120 or a second fixing groove 130 as described later.

The guide rail no includes a straight section 111 extending from one end of the base frame side member 11 along a longitudinal direction of the base frame side member 11 and an inclined section 112 extending from the straight section 111.

The first fixing groove 120 and the second fixing groove 130 to which one end (i.e., inserting portion 221) of the stopper block 220 is inserted and fixed are formed respectively at a site of the base frame side member 11 where the end portion of the straight section 111 is located and a site of the base frame side member where the end portion of the curved section 112 is located.

An inlet of the first fixing groove 120 has an enlarged flange 121 which is flared outward such that the inserting portion 221 of the stopper block 220 can be inserted easily.

The movable frame 20 is brought to be nested in and fixed to the base frame 10 to form a frame of a specific shape when one end of the stopper block 220 is fitted into and fixed to the first fixing groove 120. That is, when the inserting portion 221 of the stopper block 200 is fitted into and fixed to the first fixing groove 120, the movable frame 20 is positioned within the base frame 10 and forms a shape of a quadrilateral frame together with the base frame 10.

In addition, the movable frame 20 is brought to be fixed so as to form a configuration protruding from the base frame 10 when one end of the stopper block 220 is fitted into and fixed to the second fixing groove 130. That is, when the inserting portion 221 of the stopper block 220 is fitted into and fixed to the second fixing groove 130, the movable frame 20 is fixed to form a configuration protruding in an orthogonal direction from the base frame 10.

The wire locking mechanism 50 comprises a wire block 510 coupled to one end of the net wire 30 to rotate together with the net wire 30 and provided with a protrusion 511 protruding outward; and an elastic piece 520 having one end fixed to the movable frame 20 and the other end installed to be a free end and to contact with the protrusion 511 of the wire block 510 wherein the elastic piece serves to press the protrusion 511 of the wire block 510 by means of its elastic force.

The elastic piece 520 comprises a fixing portion 521 formed at one end to fixedly coupled to the inner surface of the movable frame 20, a manipulating portion 522 extending from the fixing portion 521 and exposed to the outside through a through hole 23 of the movable frame 20, and a pressing portion 523 extending from the manipulating portion 522 so as to protrude to the inside of the movable frame 20 and contacting with the protrusion 511 of the wire block 510.

Further, a latching jaw portion 524 is formed at the end of the pressing portion 523 wherein the net wire 30 is fixed in a state of protruding from the movable frame 20 when the protrusion 511 of the wire block 510 is latched to the latching jaw portion 524.

The net wire 30 is brought to be fixed in a form of being protruded in an orthogonal direction from the movable frame 20 when the protrusion 511 of the wire block 510 is latched to the latching jaw portion 524 of the elastic piece 520 (as indicated with a solid line in FIG. 9), and the net wire 30 is brought to rotate by its own weight to be nested in the movable frame 20 when the latching jaw portion 524 is separated from the protrusion 511 (as indicated with a dotted line in FIG. 9) as the manipulating portion 522 of the elastic piece 520 is pressed through the through hole 23 under the state that the protrusion 511 is engaged with the latching jaw portion 524.

Operation of this embodiment of the present invention will be described below.

FIGS. 2 to 5 show a state in which the base frame 10 is mounted by attaching it to the bottom surface (i.e., luggage board) 1 of the luggage room via the Velcro 60 wherein FIG. 2 shows a state in which the movable frame 20 is positioned and nested in the base frame 10. In the state of FIG. 2, the inserting portion 221 of the stopper block 220 is fitted into the first fixing groove 120 as shown in FIGS. 11 and 14, whereby the movable frame 20 is fixed in the nested state so as to be positioned in the base frame 10.

FIGS. 3 and 12 show a process in which an operator holds the movable frame connection member 22 and moves the movable frame 20 along the guide rail no from the state of FIGS. 2 and 11. At this time, the inserting portion 221 of the stopper block 220 has been slipped off from the first fixing groove 120 and hence the guide protrusion 210 can move along the guide rail 110.

FIGS. 4 and 13 show a state in which the operator moves the movable frame 20 from the state of FIGS. 3 and 12 up to the end of the base frame side member 11 and then erects and fixes the movable frame 20 in a direction orthogonal to the base frame 10. At this time, the inserting portion 221 of the stopper block 220 is inserted into the second fixing groove 130 as shown in FIGS. 13 and 15, whereby the movable frame 20 is fixed in the state of protruding in an orthogonal direction from the base frame 10.

FIG. 5 shows a state in which the net wire 30 is rotated with respect to the moving frame 20 and is fixed so as to protrude in an orthogonal direction from a state of FIG. 4. At this time, the protrusion 511 of the wire block 510 is latched by the latching jaw portion 524 of the elastic piece 520 as indicated with a solid line in FIG. 9, whereby the net wire 30 is protruded in a direction orthogonal to the moving frame 20 and kept in a fixed state.

Further, when the net wire 30 protrudes in the direction orthogonal to the moving frame 20, the net 40 provided on the net wire 30 is unfolded by its own weight so that necessary items can be contained and stored within the net 40.

After using, the net pocket apparatus is removed by manipulating it in the reverse order of the procedures as mentioned above and finally detaching the base frame 10 from the bottom surface 1 of the luggage room, and kept in a necessary place.

FIG. 6 shows a state in which the base frame 10 is mounted by attaching it to the side wall 1 (i.e., side trim) of the luggage room Lr via the Velcro 60. At this time, the movable frame 20 is in a state that it is positioned and nested in the base frame 10 and the inserting portion 221 of the stopper block 220 is in a state that it is fitted into the first fixing groove 120 as shown in FIGS. 11 and 14, whereby the movable frame 20 is fixed in the nested state so as to be positioned in the base frame 10.

In the state in which the base frame 10 is mounted on the side wall 1 of the luggage room, only rotating the net wire 30 is necessary in using the net pocket.

In other words, FIG. 7 shows a state in which the net wire 30 is rotated with respect to the moving frame 20 and is fixed so as to protrude in an orthogonal direction from a state of FIG. 6. At this time, the protrusion 511 of the wire block 510 is latched by the latching jaw portion 524 of the elastic piece 520 as indicated with a solid line in FIG. 9, whereby the net wire 30 is protruded in a direction orthogonal to the moving frame 20 and kept in a fixed state.

Further, when the net wire 30 protrudes in the direction orthogonal to the moving frame 20, the net 40 provided on the net wire 30 is unfolded by its own weight so that necessary items can be contained and stored within the net 40.

As discussed above, an embodiment according to the present invention is of a compact structure that can be detached and attached by using fabric hook and loop fasteners 60, a so-called Velcro and can be kept in a foldable manner. This makes it possible to simply fold and keep and use conveniently without any restriction on the mounting position thereof so that a superior advantageous effect of enhancing merchantability exists.

Although the present invention has been described and illustrated with respect to specific embodiments, it will be apparent by those who have ordinary skill in the art that various modifications and changes to the present invention may be made without departing from the spirit and scope of the present invention as defined in the appended patent claims.

What is claimed is:

1. A net pocket apparatus comprising:
a base frame having guide rails formed respectively on opposite inner surfaces;
a movable frame having guide protrusions moving along the guide rails, the movable frame being nested in and fixed to the base frame when the guide protrusions are positioned at one end of the guide rails and the movable frame being fixed in a form of protruding from the base frame when the guide protrusions are positioned at other ends of the guide rails;
a net wire with opposite ends rotatably coupled to the movable frame such that it is fixed to the movable frame in a form of being nested in the movable frame or a form of protruding from the movable frame;
a net coupled to the net wire, the net being unfolded by its own weight to form a storage space when the net wire is fixed in the form of protruding from the movable frame; and
a wire locking mechanism for restraining or releasing rotational movement of the net wire, the wire locking mechanism being provided at the movable frame and the net wire.

2. The net pocket apparatus of claim 1, wherein the net pocket apparatus is disposed in a luggage room of a vehicle.

3. The net pocket apparatus of claim 1, further comprising a plurality of fabric hook and loop fasteners coupled to the base frame for facilitating attachment and detachment of the base frame.

4. The net pocket apparatus of claim 3, wherein the base frame is mounted using fabric hook and loop fasteners on a bottom surface of a luggage room of a vehicle in a state of being seated thereon, or on a side wall of the luggage room in a state of being erected.

5. The net pocket apparatus of claim 1, wherein the wire locking mechanism comprises:

a wire block coupled to one end of the net wire to rotate together with the net wire and provided with a protrusion protruding outward; and
an elastic piece having one end fixed to the movable frame and the other end installed to be a free end and to contact with the protrusion of the wire block, the elastic piece serving to press the protrusion of the wire block by its elastic force.

6. The net pocket apparatus of claim 5, wherein the elastic piece comprises:
a fixing portion formed at one end to fixedly coupled to the inner surface of the movable frame;
a manipulating portion extending from the fixing portion and exposed to the outside through a through hole of the movable frame; and
a pressing portion extending from the manipulating portion so as to protrude to the inside of the movable frame and contacting with the protrusion of the wire block, wherein a latching jaw portion is formed at the end of the pressing portion and the net wire is fixed in a state of protruding from the movable frame when the protrusion of the wire block is latched to the latching jaw portion.

7. The net pocket apparatus of claim 6, wherein the net wire is brought to be fixed in a form of being protruded in an orthogonal direction from the movable frame when the protrusion of the wire block is latched to the latching jaw portion of the elastic piece, and the net wire is brought to rotate by its own weight to be nested in the movable frame when the latching jaw portion is separated from the protrusion as the manipulating portion of the elastic piece is pressed through the through hole under the state that the protrusion is engaged with the latching jaw portion.

8. The net pocket apparatus of claim 1, wherein the base frame comprises:
a pair of base frame side members on which the guide rails are formed respectively along a longitudinal direction; and
a base frame connection member connecting between one ends of the base frame side members.

9. The net pocket apparatus of claim 8, wherein the movable frame comprises:
a pair of movable frame side members with guide protrusions formed at one ends thereof so as to project laterally, the movable frame side members being nested in the inside of the base frame side members and extending along a longitudinal direction of the base frame side members respectively; and
a pair of movable frame connection member connecting between the other ends of the pair of movable frame side members in a manner of facing the pair of movable frame side members.

10. The net pocket apparatus of claim 9, further comprising stopper blocks protruding laterally and formed at one end of the movable frame side members respectively and guide protrusions formed to protrude from side surfaces of the stopper blocks, wherein the stopper blocks and the guide protrusions are installed in such a manner that only the guide protrusions are inserted into the guide rails.

11. The net pocket apparatus of claim 10, wherein each of the guide rails comprises a straight section extending from one end of an associated one of the base frame side members along the longitudinal direction of the base frame side member and an inclined section extending from the straight section, and
wherein in the base frame side member, a first fixing groove and a second fixing groove to which one end of the stopper block is fitted and fixed are formed at a site where an end portion of the straight section is located and a site where an end portion of a curved section is located, respectively;

wherein the movable frame is nested in the base frame to form a frame of a specific shape when one end of the stopper block is fitted into and fixed to the first fixing groove; and wherein the movable frame takes a form protruded from the base frame when one end of the stopper block is fitted into and fixed to the second fixing groove.

12. A net pocket apparatus comprising:

a base frame having guide rails formed respectively on opposite inner surfaces;

a movable frame having guide protrusions moving along the guide rails, the movable frame being nested in and fixed to the base frame when the guide protrusions are positioned at one end of the guide rails and the movable frame being fixed in a form of protruding from the base frame when the guide protrusions are positioned at other ends of the guide rails;

a net wire with opposite ends rotatably coupled to the movable frame such that it is fixed to the movable frame in a form of being nested in the movable frame or a form of protruding from the movable frame; and a net coupled to the net wire, the net being unfolded by its own weight to form a storage space when the net wire is fixed in the form of protruding from the movable frame;

wherein the base frame comprises a pair of base frame side members on which the guide rails are formed respectively along a longitudinal direction; and a base frame connection member connecting between one ends of the base frame side members.

13. The net pocket apparatus of claim 12, wherein the movable frame comprises:

a pair of movable frame side members with guide protrusions formed at one ends thereof so as to project laterally, the movable frame side members being nested in the inside of the base frame side members and extending along a longitudinal direction of the base frame side members respectively; and a pair of movable frame connection member connecting between the other ends of the pair of movable frame side members in a manner of facing the pair of movable frame side members.

14. The net pocket apparatus of claim 13, further comprising stopper blocks protruding laterally and formed at one end of the movable frame side members respectively and guide protrusions formed to protrude from side surfaces of the stopper blocks, wherein the stopper blocks and the guide protrusions are installed in such a manner that only the guide protrusions are inserted into the guide rails.

15. The net pocket apparatus of claim 14, wherein each of the guide rails comprises a straight section extending from one end of an associated one of the base frame side members along the longitudinal direction of the base frame side member and an inclined section extending from the straight section, and wherein in the base frame side member, a first fixing groove and a second fixing groove to which one end of the stopper block is fitted and fixed are formed at a site where an end portion of the straight section is located and a site where an end portion of a curved section is located, respectively;

wherein the movable frame is nested in the base frame to form a frame of a specific shape when one end of the stopper block is fitted into and fixed to the first fixing groove; and wherein the movable frame takes a form protruded from the base frame when one end of the stopper block is fitted into and fixed to the second fixing groove.

16. The net pocket apparatus of claim 15, wherein the movable frame is positioned in the base frame and forms a quadrilateral shaped frame together the base frame when one end of the stopper block is fitted into and fixed to the first fixing groove.

17. The net pocket apparatus of claim 15, wherein the movable frame takes a form protruded orthogonally from the base frame when one end of the stopper block is fitted into and fixed to the second fixing groove.

18. A vehicle that includes a luggage room and a net pocket apparatus disposed in the luggage room, the luggage room including a luggage board and a side trim and the net pocket apparatus comprising:

a base frame having guide rails formed respectively on opposite inner surfaces;

a movable frame having guide protrusions moving along the guide rails, the movable frame being nested in and fixed to the base frame when the guide protrusions are positioned at one end of the guide rails and the movable frame being fixed in a form of protruding from the base frame when the guide protrusions are positioned at other ends of the guide rails;

a net wire with opposite ends rotatably coupled to the movable frame such that it is fixed to the movable frame in a form of being nested in the movable frame or a form of protruding from the movable frame;

a net coupled to the net wire, the net being unfolded by its own weight to form a storage space when the net wire is fixed in the form of protruding from the movable frame; and a wire locking mechanism for restraining or releasing rotational movement of the net wire, the wire locking mechanism being provided at the movable frame and the net wire.

19. The vehicle of claim 18, wherein the base frame is mounted on the luggage board in a state of being seated thereon or on the side trim of the luggage room in a state of being erected.

20. The vehicle of claim 19, wherein the base frame is mounted using fabric hook and loop fasteners on the luggage board in the state of being seated.

\* \* \* \* \*